United States Patent
Ullrich

(10) Patent No.: US 11,066,578 B2
(45) Date of Patent: Jul. 20, 2021

(54) PRESSURE SENSITIVE ADHESIVE COMPOSITIONS

(71) Applicant: Henkel AG & Co. KGaA, Duesseldorf (DE)

(72) Inventor: Peter Ullrich, Ludwigshafen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 3 days.

(21) Appl. No.: 16/386,479

(22) Filed: Apr. 17, 2019

(65) Prior Publication Data

US 2019/0292422 A1    Sep. 26, 2019

Related U.S. Application Data

(63) Continuation of application No. PCT/EP2017/078314, filed on Nov. 6, 2017.

(60) Provisional application No. 62/419,049, filed on Nov. 8, 2016.

(51) Int. Cl.
| | |
|---|---|
| *C09J 11/06* | (2006.01) |
| *C09J 7/38* | (2018.01) |
| *C09J 11/04* | (2006.01) |
| *C08K 5/3492* | (2006.01) |
| *C08K 3/32* | (2006.01) |

(52) U.S. Cl.
CPC .............. *C09J 11/06* (2013.01); *C09J 7/385* (2018.01); *C09J 11/04* (2013.01); *C08K 5/34922* (2013.01); *C08K 5/34924* (2013.01); *C08K 2003/323* (2013.01); *C09J 2433/00* (2013.01); *Y10T 428/28* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 3,515,578 A | 6/1970 | Tomita et al. | |
| 5,164,444 A * | 11/1992 | Bernard | C08F 220/18 522/153 |
| 5,851,663 A | 12/1998 | Parsons et al. | |
| 2003/0035963 A1* | 2/2003 | Polozek | C09J 11/06 428/423.1 |
| 2004/0234753 A1* | 11/2004 | Husemann | C08K 3/32 428/343 |
| 2009/0291291 A1 | 3/2009 | Epple | |
| 2011/0228808 A1* | 9/2011 | Ayotte | G01N 25/50 374/8 |

FOREIGN PATENT DOCUMENTS

| | | | | |
|---|---|---|---|---|
| EP | 0115871 A2 * | 8/1984 | | C08K 5/3492 |
| EP | 0204027 | 12/1986 | | |
| EP | 0204027 A1 * | 12/1986 | | C08K 3/32 |
| WO | 199532257 | 5/1995 | | |
| WO | 2016109261 | 7/2016 | | |
| WO | 2016141001 | 9/2016 | | |

OTHER PUBLICATIONS

"Decabromodiphenyl oxide", PubChem, retrieved on Aug. 10, 2020 (Year: 2020).*
International Search Report issued in connection with International Patent Application No. PCT/EP2017/078314 dated Jan. 10, 2018.

* cited by examiner

*Primary Examiner* — Anish P Desai
(74) *Attorney, Agent, or Firm* — Steven C. Bauman

(57) ABSTRACT

A pressure sensitive adhesive having improved flame retardancy properties, methods for making same and applications thereof are described. The pressure sensitive adhesive comprises an aqueous based acrylic emulsion and a mixture of halogenated and non-halogenated flame retardants.

11 Claims, 2 Drawing Sheets

PRESSURE SENSITIVE ADHESIVE COMPOSITIONS

BACKGROUND

Field

The present invention relates to pressure sensitive adhesive compositions having improved flame retardancy.

Brief Description of Related Technology

Adhesive tapes and labels are attractive products from a consumer compliance perspective in that they are easily manipulated and stored, and they find utility in a wide range of bonding and masking applications, including bonding electrical, electronic, aerospace, and audio/video components.

Pressure-sensitive adhesives are viscoelastic materials and can be provided without a carrier in the form of transfer tapes, or carrier-based as single- or double-sided tapes. They remain tacky for a long period of time, and need only minimum pressure to stick to a surface, even to difficult-to-bond surfaces like polyethylene or polypropylene. Normally, they can be removed without leaving any adhesive residues, and without destroying the joined parts.

Many applications of pressure-sensitive adhesives require the adhesive to have flame resistance or flame retardancy properties.

Flame retardants are chemicals which are added to combustible materials to render them more resistant to ignition, and enhance their flame retardancy. Flame retardant materials often consist of halogen-containing compounds, particularly brominated and/or chlorinated compounds. Although these compounds impart flame retardancy properties to combustible materials, there are environmental and safety concerns with their use. During combustion, halogenated compounds emit corrosive smoke due to the presence of gases such as HCl and HBr, which in addition to being toxic, can also result in damage to materials not directly involved in the fire. Accordingly, there is a desire to decrease reliance on such halogenated compounds.

Traditionally antimony trioxide has been employed in concert with halogenated compounds as flame retardant additives; such combinations have been used heretofore in pressure-sensitive adhesives. While antimony trioxide itself is not a fire retardant, when used in combination with halogenated compounds, a synergistic flame retardant effect is observed, resulting in enhanced flame retardancy of the adhesives.

U.S. Pat. No. 3,515,578 describes a pressure-sensitive adhesive comprising between 5 and 60 parts of a tris-(halogenated alkyl)phosphate having at least 3 carbon atoms in each alkyl group and at least two halogen atoms on each alkyl group. The pressure-sensitive adhesive composition preferably comprises between about 2 and 30 parts of antimony trioxide.

U.S. patent application Ser. No. 12/306,375 describes flame retardant pressure-sensitive adhesive compositions containing a metal oxide, a metal hydrate, a halogenated material and a liquid phosphorous bromide. Preferably, the metal oxide is reported to be antimony trioxide, magnesium oxide, aluminium oxide or combinations thereof. The flame retardant accounts for 50 to 75 wt % of the adhesive composition.

Increased environmental awareness is driving a movement towards reducing, if not eliminating, the presence of antimony trioxide.

International Patent Application Publication No. WO 1995/32257 describes flame retardant pressure-sensitive adhesives and tapes. The adhesive compositions may comprise a wide variety of non-halogen phosphorous/nitrogen flame retardants. While acrylic adhesive compositions described therein are reported to meet the requirements of the UL510 flammability test, the quantity of flame retardant required to achieve such a result accounts for over 35 wt % of the adhesive composition.

International Patent Publication No. WO2016/109261 describes a halogen-free flame retardant adhesive composition which was demonstrated to pass the UL510 flammability test, said composition comprises an acrylic copolymer comprising a phosphinate containing monomer.

Improving the flame retardant properties of a pressure-sensitive adhesive is not a trivial task; maintaining a balance when including any additives such that pressure sensitivity, adhesive, cohesive, elongation and elastic properties of the adhesive are retained is quite important to creating a product that will have a chance of commercial success. The addition of additive packages to a base pressure-sensitive adhesive material, often disrupts the necessary balance of properties and can have a deleterious effect on one or more properties of the pressure-sensitive adhesive material. For example, the addition of flame retardants such as tricresyl phosphate and tributyl phosphate to polyacrylate pressure-sensitive adhesive compositions, has a detrimental effect on the cohesive properties of the resultant composition, resulting in a suboptimal composition.

Notwithstanding the state of the art there remains a need for alternative pressure-sensitive adhesive compositions that exhibit improved flame retardancy. Accordingly, it would be desirable to identify optimal flame retardant additive packages for pressure-sensitive adhesives which impart flame retardancy to said adhesives without having a deleterious impact on other properties of the adhesive. Providing a pressure sensitive adhesive with improved flame retardancy and which demonstrates good storage stability, good adhesion to a wide variety of substrates, is easy and inexpensive to manufacture, and which exhibits a combination of high initial tack and strong bond strength is desirable.

SUMMARY

In one aspect, the present invention provides a pressure sensitive adhesive composition comprising:
(a) an acrylic emulsion;
(b) non-halogenated flame retardants comprising: melamine cyanurate and ammonium polyphosphate; and
(c) halogenated flame retardants comprising at least one brominated organic compound;
where the total amount of melamine cyanurate is from 0.5 wt % to 2.5 wt % based on the total weight of the composition; the total amount of ammonium polyphosphate is from 4 wt % to 9 wt % based on the total weight of the composition; and the total amount of brominated organic compound is at least 14.5 wt % based on the total weight of the composition.

Compositions of this sort have been found to exhibit a desirable balance between fire resistance and bond strengths.

Also such compositions are curable, but remain uncured until a pressure sufficient to effect cure is applied.

The total amount of non-halogenated flame retardants may be less than 10 wt % based on the total weight of the composition.

Suitably, the total amount of ammonium polyphosphate is from 4 wt % to 6 wt % based on the total weight of the composition. Advantageously, adhesive performance is enhanced when the total amount of ammonium polyphosphate is from 4 wt % to 6 wt % based on the total weight of the composition.

Suitably, the total amount of non-halogenated flame retardant and halogenated flame retardant is less than 30 wt %, such as less than 25 wt % based on the total weight of the composition. Advantageously, the compositions of the invention retain pressure sensitivity and adhesive performance but have improved flame retardancy performance.

The acrylic emulsion may be present in an amount of from about 50 wt % to about 75 wt % based on the total weight of the composition.

The acrylic emulsion is a pressure-sensitive adhesive material. The acrylic emulsion pressure-sensitive material may be selected from a wide variety of polymers and copolymers derived from acrylic and/or methacrylic acid, ester, amide and nitrile derivatives thereof, as well as combinations thereof. The polymers and copolymers desirably have a low Tg (e.g. <0° C.), so that the mass of the polymer is tacky at ambient temperatures. This advantageously removes the requirement for incorporating additional tackifying resins. Examples of useful acrylate base materials include homopolymers and copolymers of acrylic acid, methacrylic acid, isooctyl acrylate, acrylamide, methacrylamide, acrylonitrile, methacrylonitrile methyl isoamul acrylate, 2-ethylhexylacrylate and butyl acrylate. Suitably, the acrylic copolymer emulsion may for example comprise an acrylate-acrylonitrile copolymer, an ethylene-acrylic acid copolymer, an acrylic-vinyl acetate copolymer or combinations thereof.

Suitably the acrylic emulsion is an acrylic-vinyl acetate copolymer. The acrylic emulsion may be an aqueous acrylic emulsion, such as an aqueous acrylic-vinyl acetate copolymer.

Suitably, the acrylic-vinyl acetate copolymer is formed from acrylate monomers selected from acrylic acid, methacrylic acid, methyl acrylate, ethyl acrylate, propyl acrylate, butyl acrylate, isopropenyl acrylate, isooctyl acrylate, 3-methylbutyl acrylate, 6-methylheptyl acrylate, 2-ethylhexyl acrylate, acrylamide, methacrylamide, acrylonitrile and methacrylonitrile and combinations thereof. The vinyl component may for example be derived from the following monomers: vinyl acetate, methyl vinyl acetate, ethyl vinyl acetate, propyl vinyl acetate, isopropenyl acetate and combinations thereof.

The acrylic emulsion may include a mixture of two or more polymers.

The brominated organic compound may for example be selected from the group consisting of: ethylene bis (tetrabromo phthalimide), pentabromo diphenylether, octabromo diphenylether, decabromo diphenylether, tetrabromo bisphenol A, and hexabromo cyclodecane.

Suitably, the melamine cyanurate is present in an amount of 1.4 to 2.5 wt % based on the total weight of the composition. Surprisingly, when greater than 2.5 wt % of melamine cyanurate is present, flame retardancy may be adversely affected.

In addition, the compositions of the invention may comprise further additives, including tackifiers, toughening agents, antioxidants, stabilizers, dyes, preservatives and/or combinations thereof.

Suitably, the compositions of the invention have a lap shear strength of approximately 50 psi (0.345 MPa) or greater as determined in accordance with ASTM D1002-05 or ASTM D3163. For example, the compositions of the invention may have a lap shear strength of approximately 55 psi (0.379 MPa), or 60 psi (0.414 MPa), or 65 psi (0.448 MPa), or 70 psi (0.483 MPa) or greater.

The present invention also provides an article, comprising a curable film on a release substrate and/or carrier substrate, wherein the curable film comprises the pressure sensitive adhesive composition according to the invention. For example, the present invention provides the pressure sensitive adhesive composition in the form of adhesive tapes, transfer tapes, labels and laminates.

In another embodiment, the present invention provides a transfer tape comprising a layer of the pressure sensitive adhesive composition according to the invention, to which is attached a release liner.

In yet a further embodiment, a pressure-sensitive adhesive tape comprising a backing bearing a layer of pressure sensitive adhesive composition according to the invention is provided, wherein said composition is provided on at least one side of the backing.

The compositions of the invention possess both excellent flame retardant and adhesive characteristics.

BRIEF DESCRIPTION OF THE DRAWINGS

Embodiments of the invention will be described, by way of example only, with reference to the accompanying drawings in which.

DETAILED DESCRIPTION

Figure 1:
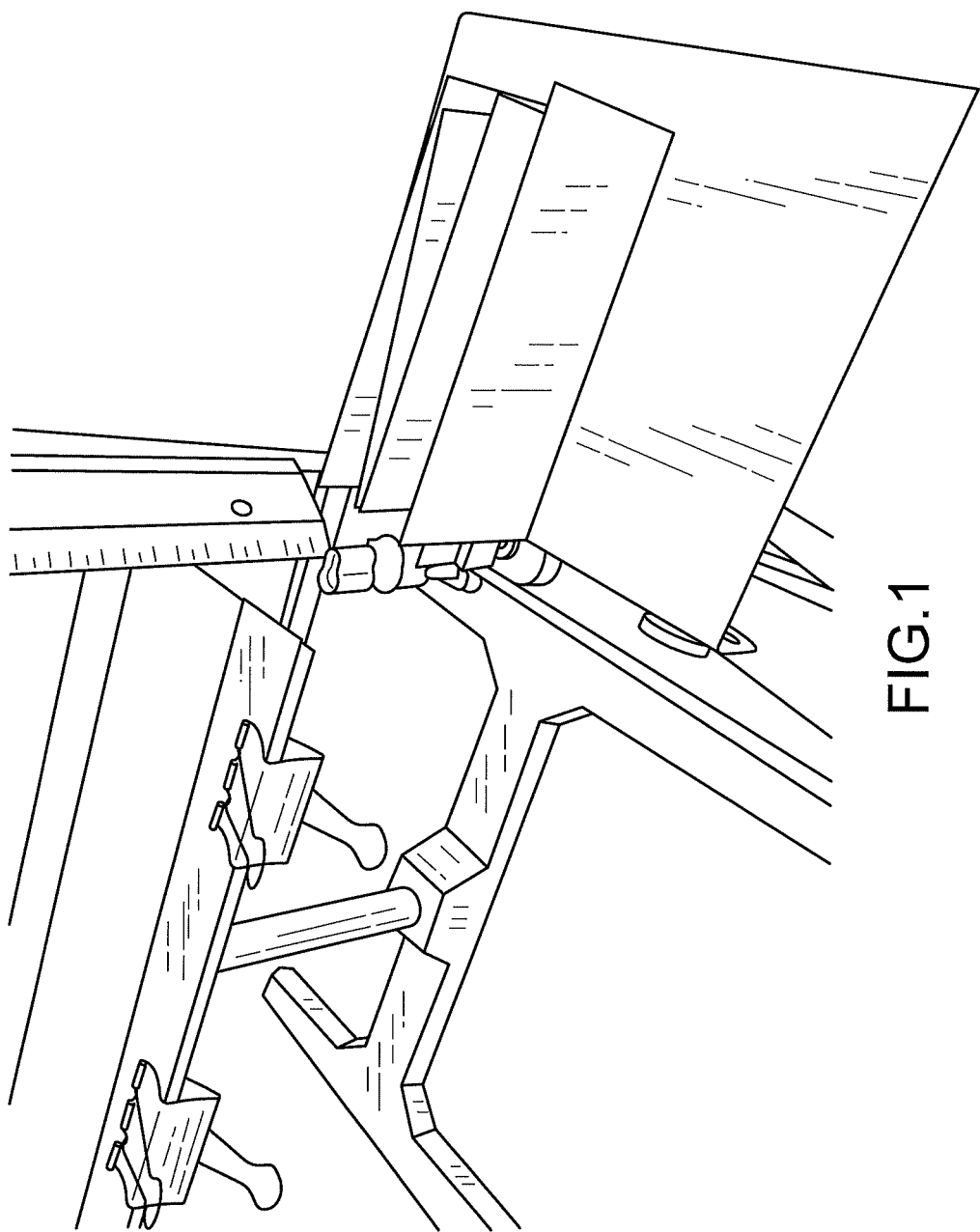
FIG. 1 shows the FMVSS 302 experimental set up for testing the flame retardancy of prepared sample specimen. The sample specimen comprise two sheets of clear polyethylene terephthalate film between which a test composition is applied.

As used herein, the term "pressure sensitive adhesive" refers to adhesive compositions which forms a bond when pressure is applied to marry the adhesive with an adherend. No solvent, water, or heat is needed to activate the adhesive. More particularly said term is used for materials or formulations having a glass transition temperature ($T_g$) of less than 25° C. and a storage modulus G' of $3.3 \times 10^5$ Pa or less at 23° C., wherein the glass transition temperature ($T_g$) is determined by Differential Scanning calorimetry (DSC) and the storage modulus G' is determined by Dynamic Mechanical Analysis (DMA) at 1 Hz, and at 23° C.

The acrylic copolymer emulsion can be an acrylate-acrylonitrile dispersion, an ethylene-acrylic acid dispersion, or another acrylate copolymer dispersion.

Monomers for forming the acrylic copolymer emulsion may be represented by the formula:

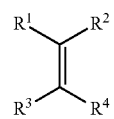

wherein:

$R^1$ may be selected from hydrogen, halo, or $C_1$-$C_{20}$ aliphatic, which may be substituted or unsubstituted with one or more of halo, amino, hydroxyl, nitrile, $C_1$-$C_5$ alkoxy or combinations thereof;

$R^2$ is nitrile, —O(CO)$R^5$, —CONH$R^5$, —SO$_2R^5$, —CO$_2R^5$, —(CO)—$R^5$ where $R^5$ is hydrogen or $C_1$-$C_{20}$ aliphatic, which may be substituted or unsubstituted with one or more of halo, amino, hydroxyl, nitrile, $C_1$-$C_5$ alkoxy or combinations thereof;

$R^3$ is H or $C_1$-$C_8$ alkyl; and
$R^4$ is H or $C_1$-$C_8$ alkyl.

$R^1$ may be hydrogen, or $C_1$-$C_{10}$ alkyl, for example, methyl, ethyl, propyl or butyl.

$R^2$ may be an ester such as —CO$_2R^5$ or —O(CO)$R^5$.

$R^3$ may be hydrogen, or $C_1$-$C_{10}$ alkyl, for example, methyl, ethyl, propyl or butyl.

$R^4$ may be hydrogen, or $C_1$-$C_{10}$ alkyl, for example, methyl, ethyl, propyl or butyl.

$R^5$ may be hydrogen, or $C_1$-$C_{10}$ alkyl, for example, methyl, ethyl, propyl or butyl.

Suitably, the monomeric acrylic component of the acrylic copolymer emulsion may be (meth)acrylic acid, $C_1$-$C_8$ alkyl (meth)acrylate, or $C_1$-$C_{13}$ hydroxyalkyl (meth)acrylate. Suitably, the acrylic component may be acrylic acid or methacrylic acid.

The monomeric non-acrylic component of the acrylic copolymer emulsion may for example be at least one of a vinyl ester, such as vinyl acetate, methyl vinyl acetate, ethyl vinyl acetate.

The acrylic emulsion is suitably, an aqueous emulsion.

The viscosity of the emulsion is suitably less than 2000 mPa·s when measured at 23° using a Brookfield Viscometer and RV-2 Spindle at 50 rpm. This facilitates application of the emulsion to a substrate.

The glass transition temperature (Tg) of the acrylic copolymer as determined using differential scanning calorimetry is less than 0° C., suitably from −20 to −60° C. For example, the Tg may be approximately −30° C., or −40° C., or −50° C. If the Tg is greater than 0° C., the acrylic copolymer will no longer be tacky at room temperature.

Acrylate-acrylonitrile dispersions are available under the trade names Saitek® 400, manufactured by Saiden Technologies; or Acronal® 35D, Acronal® 81D, Acronal® A200, Acronal® A220, Acronal® A280, Acronal® A323, Acronal® A378, Acronal® A380, Acronal® B37D, or Acronal® DS3390, all manufactured by the BASF Corporation. Ethylene-acrylic acid dispersion products are available under the trade names Adcote® 50T4983 or Adcote® 50T4990, both manufactured by Morton International. Suitably acrylate copolymer emulsions are sold under the trade names Acronal® 210 or Acronal® V275, both manufactured by the BASF Corporation. Two alternative commercially available acrylic emulsions are provided by Momentive, namely those provided under the trade name Synthebond® E-2050 and Synthebond®-7701.

The compositions of the invention may further comprise tackifiers, thickeners, defoaming agents, dispersing agents, toughening agents, antioxidants, stabilizers, dyes, preservatives and/or combinations thereof.

Suitable tackifiers are known to persons skilled in the art. Sources of tackifiers can be found in standard publications on pressure sensitive adhesives, for example, the "Handbook of Pressure Sensitive Adhesive Technology" from Donata Satas (van Notstrand, New York, 1989).

Examples of filler components include but are not limited to, for example, silicas, quartz, alumina, calcium magnesium carbonate, calcium silicate hydrate, calcium carbonate, clays, talcs and other inorganic filler materials such as polycarbonates and other polymer powders, along with certain acrylate components.

Examples of stabiliser components which may be suitably used in the adhesive film of the present invention include hydroquinone, pyrocatechol, resorcinol or derivatives thereof, phenols, sulfur dioxide, sulfuric acid, alkyl sulfonic acids, aromatic sulfonic acids, boranes and combinations thereof. For example, the stabiliser may be selected from methanesulfonic acid (MSA), $BF_3$, $SO_2$ and combinations thereof. Suitably, the stabiliser may be selected from camphor sulfonic acid (CSA) or hydroquinone and combinations thereof.

Useful thickeners include oliginates, bentonite, casein, fumed silica, guar gum, gum tragacanth, hydroxyethyl cellulose, locust bean gum, methylcellulose, polyacrylic acid salts (e.g., ammonium, potassium, sodium salts), polyvinyl alcohol, sodium carboxymethyl cellulose, and starches.

Defoamers, defoaming agents or foam inhibitors in the context of the invention are substances which are added to foaming liquids to reduce their foaming or to prevent them from foaming. They are either interfacially active substances which displace the foam generators from the interface without themselves producing any foam or products which increase the surface tension of water, for example natural fats and oils or fatty alcohols. The use of the defoamers is not absolutely essential, but is nevertheless helpful. For example, long-chain soaps, such as sodium behenate, may be used as the defoamer. Other suitable defoamers include mineral oils, and compounds based on silicone, such as silicone oils. Suitably, defoamer includes polyethylene/propylene glycol ethers which are known commercially as Pluronics®, and the corresponding mixed ethers of these compounds. If present the defoamer is employed in typically 1 wt % or less based on the total weight of the composition.

The present invention also provides for articles comprising the pressure sensitive adhesive composition of the invention. For example, the present invention provides for articles comprising a curable film on a release substrate and/or carrier substrate, wherein the curable film comprises the pressure sensitive adhesive composition according to the invention.

The article may be an adhesive tape, a transfer tape, a label or laminate comprising the pressure sensitive adhesive composition according to the invention.

In one embodiment, the transfer tape may comprise a layer of the pressure sensitive adhesive composition according to the invention, which is attached to a release substrate (or release liner).

In a further embodiment, the pressure-sensitive adhesive tape comprising a backing bearing a layer of pressure sensitive adhesive composition according to the invention is provided, wherein said composition is provided on at least one side of the backing.

The release substrate may be paper, or plastic based (e.g. PET, PE, HDPE, and PP) materials, which are optionally coated with a release agent.

Release agents allow the adhesive films of the article of the present invention to be easily transferred from the release substrate to the article of interest. The release agent may be selected from the group consisting of polyvinyl alcohol, clays, siloxanes, and combinations thereof. Suitable release agents, in particular siloxane-based release agents, are available under the trade name SILCOLEASE®.

As used herein, the term carrier substrate refers to a material onto which a curable film of the pressure sensitive adhesive of the invention can be coated so as to allow for handling of the adhesive. The carrier substrate can add mechanical strength to the article so as to improve handling.

The carrier substrate may be flexible, for example a flexible sheet. The carrier substrate may be selected from polymeric films, metal foils, foams, cloths, and combinations thereof. For example, the carrier substrate may be selected from the group consisting of polyester, polypropylene, polyethylene, foam and paper.

Examples

As used above and below, the term flame-retardant pressure sensitive adhesive refers to pressure-sensitive adhesive compositions in which basic flammability has been reduced by adding a flame-retardant system and is measured according to Federal Motor Vehicle Safety Standard FMVSS 302. ISO 3795 is a technically equivalent standard used in Europe, Canada, and Japan; while ASTM D5132-04 is used in the US. The FMVSS 302 specifies the burn resistance requirements for materials used in the occupant compartments of motor vehicles (La, passenger cars, multipurpose passenger vehicles, trucks and buses).

Compositions were prepared and subsequently tested in accordance with FMCSS 302. The compositions were prepared as outlined below:

Water and optional additives such as a defoamer and dispersing agents were mixed at high speed with a laboratory mixer and then the non-halogenated flame retardants (i.e. melamine cyanurate and ammonium polyphosphate) and the halogenated flame retardants (i.e. at least one brominated organic compound) were added at lower speed to avoid foaming. Mixing was continued until homogeneous. In the next step, the acrylate emulsion(s) was/were added and the resulting mixture was stirred at lower speed until a homogeneous product was formed.

The acrylic emulsions may be any of those described herein, though in the below examples, those provided under the trade names Synthebond™ E 2050 and Acronal™ V 275 were employed. A suitable source of melamine cyanurate is that provided under the trade name Budit™ 315. A suitable source of ammonium polyphosphate is FR Cros S10™. The brominated organic compound may be any of those described herein, though in the below examples, that provided under the trade name Saytex® BT 93 W was employed. As outlined above, any suitable defoaming agent may be used in the compositions of the invention, though in the below examples, that provided under the trade name Byk®-1640 was used. Similarly, any suitably dispersing agent may be used in the compositions of the invention, though in the below examples, that provided under the trade name Disperbyk®-2010 was employed.

Test Procedure

Sample specimens were prepared as follows:

A test composition is applied to a clear polyethylene terephthalate (PET) film (thickness of ~0.0564 mm, width ~15.2 cm) using a 5 mL pipette. The composition is spread evenly with an applicator rod (wire wound wet film applicator rod 20" (51.3 microns wet film thickness) over the film. The PET film with the sample evenly spread thereon, is then dried in an oven at 80° C. for approximately 5 minutes. Once removed from the oven, the specimen is allowed to cool to room temperature and a second sheet of clear PET film is applied to the composition on the first sheet of PET film, thereby forming a sandwich structure of two PET films with the adhesive composition therebetween. The two films were then bonded together by applying pressure to the sandwich using a roller.

Each specimen is then tested according to FMVSS 302. Each specimen is placed in a U-shaped holder and fixed with clamps. The specimen is burned with a butane gas burner whose flame has been adjusted to a 3-5 cm long blue area. Each specimen is burned for 15 seconds. The space between burner and foil ~38 mm. Each specimen is assessed according FMVSS 302.

Figure 2:
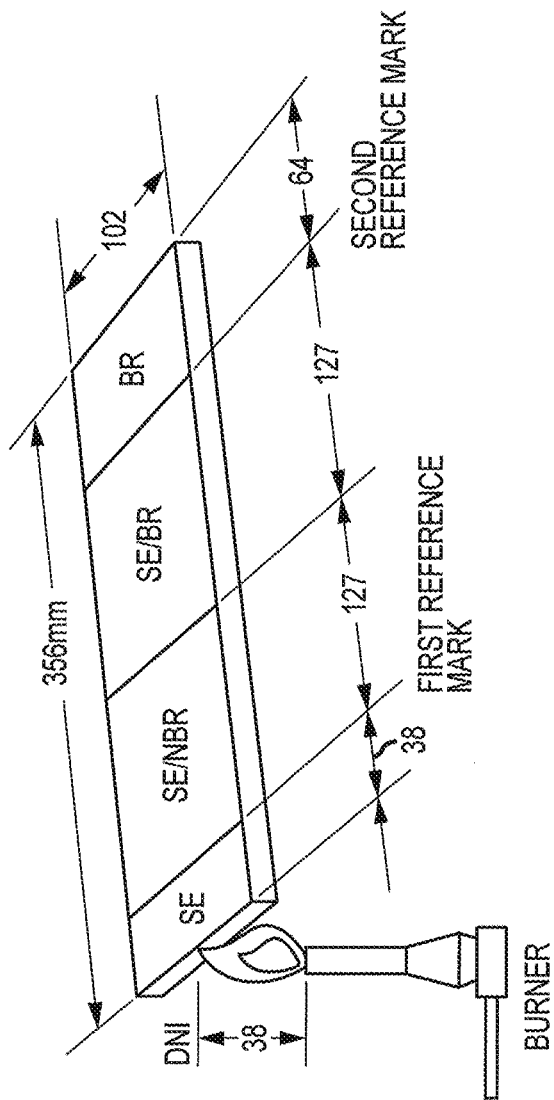
FIG. 2 shows the burn rate categories for the FMVSS 302 test.

The test is conducted inside a test chamber where the test specimen is mounted horizontally. The exposed side of the test specimen is subjected to a gas flame from underneath. As shown in FIG. 2, the burn distance and the time taken to burn this distance is measured during the test. The result, the burning rate, is expressed in mm/min. Categories of burning are expressed as follows: DNI=does not ignite; SE=self-extinguishing; SE/NBR=self-extinguishing/no burn rate; SE/BR=self-extinguishing with burn rate; BR=burn rate. For the compositions of the invention, an acceptable burn rating is SE, with the best burn distance being around 15-25 mm.

Lap Shear Strength

Lap shear strengths were determined in accordance with ASTM D1002-05 or ASTM D3163.

PET film was coated with a sample adhesive composition to create a 0.001" (0.025 mm) wet film thickness. The composition was dried for 5 minutes at 85° C. After cooling, the film with the composition thereon was cut into 1" (25.4 mm) wide strips. Two strips were adhesively mated to create a 0.5" (12.7 mm) overlap. The mated area was pressed using a weighted roller, rolling one time parallel to the overlapping area and one time perpendicular to the overlapping area. After curing for one day at room temperature under standard conditions, specimens were placed in the grips of a universal testing machine and pulled at 2.36" (60 mm) per minute cross head speed.

TABLE 1

| Raw materials | Composition No./Amt (wt %) | | | | | | |
|---|---|---|---|---|---|---|---|
| | 1 | 2 | 3 | 4 | 5 | 6 | 7 |
| Acronal ™ V 275 | 25.45 | 25.45 | 25.41 | 25.25 | 25.25 | 25.25 | 31.90 |
| Synthebond ™ E 2050 | 25.45 | 25.45 | 25.41 | 25.25 | 25.25 | 25.25 | 31.90 |
| Ammonium hydroxide 27% | 0.40 | 0.40 | 0.40 | 0.42 | 0.42 | 0.42 | 0.31 |
| Disperbyk ™ 2010 | 0.20 | 0.20 | 2.19 | 0.72 | 0.50 | 0.50 | 1.23 |
| Byk ™ 1640 | 0.10 | 0.10 | 0.25 | 0.10 | 0.22 | 0.22 | 0.31 |
| Saytex ™ BT 93 W | 0.00 | 0.00 | 0.00 | 0.00 | 0.00 | 0.00 | 0.00 |
| Budit ™ 315 | 0.00 | 0.00 | 2.50 | 1.50 | 9.00 | 13.40 | 1.84 |
| FR Cros S-10 ™ | 19.46 | 22.45 | 22.42 | 25.30 | 17.80 | 13.40 | 6.13 |

TABLE 1-continued

| Raw materials | Composition No./Amt (wt %) | | | | | | |
|---|---|---|---|---|---|---|---|
| | 1 | 2 | 3 | 4 | 5 | 6 | 7 |
| Water | 28.94 | 25.95 | 21.42 | 21.46 | 21.56 | 21.56 | 26.38 |
| Burn Distance [mm] | 280 | 75 | 30 | 30 | 70 | 280 | 280 |
| Burn Rate | BR | SE/NBR | SE | SE | SE/NBR | BR | BR |

Compositions 1 and 2 do not comprise either melamine cyanurate or a brominated organic compound as flame retardant. Said compositions did not pass the FMVSS 320 test i.e. said compositions were not self-extinguishing under the test conditions.

Compositions 3 to 7 comprise varying amounts of melamine cyanurate and ammonium polyphosphate but do not comprise a brominated organic compound as flame retardant. While compositions 3 and 4 passed the FMVSS 320 test i.e. said compositions were self-extinguishing under the test conditions, the adhesive performance of said compositions was sub-optimal, with tackiness being adversely affected.

Furthermore, compositions comprising only melamine cyanurate and ammonium polyphosphate (i.e., compositions 3 to 7) demonstrated reduced tackiness. The viscosity of said compositions was also too high for the desired applications.

TABLE 2

| Raw materials | Composition No./Amt (wt %) | | | | | | | | |
|---|---|---|---|---|---|---|---|---|---|
| | 8 | 9 | 10 | 11 | 12 | 13 | 14 | 15 | 16 |
| Acronal ™ V 275 | 28.42 | 28.42 | 28.42 | 28.42 | 28.42 | 28.42 | 28.42 | 28.42 | 28.42 |
| Synthebond ™ E 2050 | 28.42 | 28.42 | 28.42 | 28.42 | 28.42 | 28.42 | 28.42 | 28.42 | 28.42 |
| NH4 + OH— 27% | 0.27 | 0.27 | 0.27 | 0.27 | 0.27 | 0.27 | 0.27 | 0.27 | 0.27 |
| Disperbyk ™ 2010 | 1.09 | 1.09 | 1.09 | 1.09 | 1.09 | 1.09 | 1.09 | 1.09 | 1.09 |
| Byk ™ 1640 | 0.28 | 0.28 | 0.28 | 0.28 | 0.28 | 0.28 | 0.28 | 0.28 | 0.28 |
| Saytex B ™ T 93 W | 8.36 | 9.95 | 10.52 | 10.89 | 11.22 | 12.62 | 13.12 | 13.61 | 14.28 |
| Budit ™ 315 | 1.31 | 0.62 | 1.50 | 1.70 | 0.40 | 1.80 | 1.17 | 0.34 | 0.89 |
| FR Cros S-10 ™ | 8.36 | 7.46 | 6.01 | 5.44 | 6.41 | 3.61 | 3.74 | 4.08 | 2.86 |
| Water | 23.49 | 23.49 | 23.49 | 23.49 | 23.49 | 23.49 | 23.49 | 23.49 | 23.49 |
| Burn Distance [mm] | 170 | 280 | 280 | 270 | 270 | 280 | 280 | 280 | 280 |
| Burn Rate | BR | BR | BR | BR | BR | BR | BR | BR | BR |

TABLE 3

| Raw materials | Composition No./Amt (wt %) | | | | | | | |
|---|---|---|---|---|---|---|---|---|
| | 17 | 18 | 19 | 20 | 21 | 22 | 23 | 24 |
| Acronal ™ V 275 | 26.06 | 25.72 | 26.10 | 25.39 | 25.86 | 25.00 | 25.25 | 25.29 |
| Synthebond ™ E 2050 | 26.06 | 25.72 | 31.30 | 25.39 | 25.86 | 25.00 | 25.25 | 25.29 |
| NH$_4$OH 27% | | | | | | 0.24 | 0.24 | 0.39 |
| Disperbyk ™ 2010 | 2.25 | 2.22 | 1.15 | 2.19 | 2.12 | 0.96 | 0.97 | 2.09 |
| Byk ™ 1640 | 0.22 | 0.22 | 0.21 | 0.21 | 0.20 | 0.24 | 0.24 | 0.24 |
| Saytex BT 93 W | 14.80 | 15.42 | 15.66 | 16.02 | 18.18 | 19.23 | 19.42 | 19.46 |
| Budit ™ 315 | 1.94 | 2.02 | 2.09 | 2.10 | 1.52 | 1.44 | 2.91 | 1.46 |
| FR Cros S-10 ™ | 7.15 | 7.45 | 5.74 | 7.74 | 5.05 | 7.21 | 4.85 | 4.86 |
| Water | 21.52 | 21.23 | 17.75 | 20.96 | 21.21 | 20.68 | 20.87 | 20.92 |
| Burn Distance [mm] | 26 | 17 | 19 | 13 | 30 | 24 | 45 | 16 |
| Burn Rate | SE | SE | SE | SE | SE | SE | SE/NBR | SE |
| Lap shear [psi] | — | — | 53.6 ± 5.1 | 57.3 ± 3.7 | — | — | — | — |

| Raw materials | Composition No./Amt (wt %) | | | | | | |
|---|---|---|---|---|---|---|---|
| | 25 | 26 | 27 | 28 | 29 | 30 | 31 |
| Acronal ™ V 275 | 25.43 | 25.81 | 26.26 | 26.94 | 23.32 | 21.40 | 25.83 |
| Synthebond ™ E 2050 | 25.43 | 25.81 | 26.26 | 26.94 | 23.32 | 21.40 | 28.93 |
| NH$_4$OH 27% | 0.24 | 0.25 | 0.25 | 0.26 | 0.22 | 0.21 | — |
| Disperbyk ™ 2010 | 0.98 | 0.99 | 1.01 | 1.04 | 0.90 | 0.82 | 1.14 |
| Byk ™ 1640 | 0.24 | 0.25 | 0.25 | 0.26 | 0.22 | 0.21 | 0.21 |
| Saytex BT 93 W | 19.56 | 19.85 | 20.20 | 20.73 | 26.91 | 32.92 | 15.50 |
| Budit ™ 315 | 2.20 | 0.74 | 1.52 | 1.55 | 1.35 | 1.23 | 2.07 |
| FR Cros S-10 ™ | 4.89 | 4.96 | 2.53 | 0.00 | 4.48 | 4.12 | 6.71 |
| Water | 21.03 | 21.34 | 21.72 | 22.28 | 19.28 | 17.69 | 19.63 |
| Burn Distance [mm] | 35 | 20 | 108 | 280 | 18 | 15 | 18 |
| Burn Rate | SE | SE | SE/NBR | BR | SE | SE | SE |
| Lap shear [psi] | — | — | — | — | — | — | 53.6 ± 2.6 |

As is evident from Table 2, when the brominated organic compound is present in less than 14.5 wt % the compositions performed poorly. Table 3, when the brominated organic compound was added at levels of over 14.5 wt % based on the total weight of the composition, the fire retardancy of said compositions generally improved. However, as is clear from compositions 26, 27 and 28, insufficient or the absence of ammonium polyphosphate results in inferior compositions from a flame retardancy standpoint. The test results for composition 23 demonstrate that when greater than 2.5 wt % melamine cyanurate was present the fire burn rate was also increased. Optimal results were achieved when ammonium polyphosphate was present in an amount of from 4 wt % to 9 wt % and when melamine cyanurate was present in an amount of from 0.5 wt % to 2.5 wt %, each based on the total weight of the composition.

Interestingly, when the amount of melamine cyanurate was increased above 2.5 wt % based on the total weight of composition, longer burn distances were observed. In addition, when the amount of ammonium polyphosphate is from 4 wt % to 6 wt % based on the total weight of composition, enhanced adhesive performance was observed.

Desirably, when the lap shear strength of compositions of the invention was assessed, said compositions had lap shear strengths in excess of 50 psi (0.345 MPa) or greater as determined in accordance with ASTM D1002-05 or ASTM D3163.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A pressure sensitive adhesive composition comprising:
   (a) 50 wt % to 75 wt % based on the total weight of the composition of an acrylic emulsion;
   (b) less than 10 wt % based on the total weight of the composition of non-halogenated flame retardants comprising: melamine cyanurate and ammonium polyphosphate; and
   (c) halogenated flame retardants comprising at least one brominated organic compound;
   wherein the total amount of melamine cyanurate is from 0.5 wt % to 2.5 wt % based on the total weight of the composition;
   the total amount of ammonium polyphosphate is from 4 wt % to 9 wt % based on the total weight of the composition;
   the total amount of brominated organic compound is at least 14.5 wt % based on the total weight of the composition; and
   the total amount of non-halogenated flame retardants and halogenated flamed retardants is less than 30 wt % based on the total weight of the composition.

2. The pressure sensitive adhesive composition according to claim 1 wherein the total amount of ammonium polyphosphate is from 4 wt % to 6 wt % based on the total weight of the composition.

3. The pressure sensitive adhesive composition according to claim 1 wherein the total amount of non-halogenated flame retardant and halogenated flame retardant is less than 25 wt % based on the total weight of the composition.

4. The pressure sensitive adhesive composition according to claim 1 wherein the acrylic emulsion comprises an acrylic-vinyl acetate co-polymer.

5. The pressure sensitive adhesive composition according to claim 1 wherein the brominated organic compound is selected from the group consisting of: ethylene bis (tetrabromo phthalimide), pentabromo diphenylether, octabromo diphenylether, decabromo diphenylether, tetrabromo bisphenol A, and hexabromo cyclodecane.

6. The pressure sensitive adhesive composition according to claim 1 wherein the melamine cyanurate is present in an amount of 1.4 to 2.5 wt % based on the total weight of the composition.

7. The pressure sensitive adhesive composition according to claim 1 further comprising a tackifier, plasticizer, toughening agent, antioxidant, stabilizer, dye, preservative and/or combinations thereof.

8. An article, comprising a curable film on a release substrate and/or carrier substrate, wherein the curable film comprises the pressure sensitive adhesive composition according to claim 1.

9. A transfer tape comprising a layer of the pressure sensitive adhesive composition according to claim 1 and is attached to a release liner.

10. A pressure-sensitive adhesive tape comprising a backing bearing a layer of pressure sensitive adhesive composition according to claim 1 on at least one side of the backing.

11. The pressure sensitive adhesive composition according to claim 1 wherein the composition is self extinguishing with a burn distance of between about 15 to 25 mm.

* * * * *